S. P. BUSH.
METHOD OF MAKING CAR WHEELS.
APPLICATION FILED APR. 13, 1912.
1,047,378.
Patented Dec. 17, 1912.
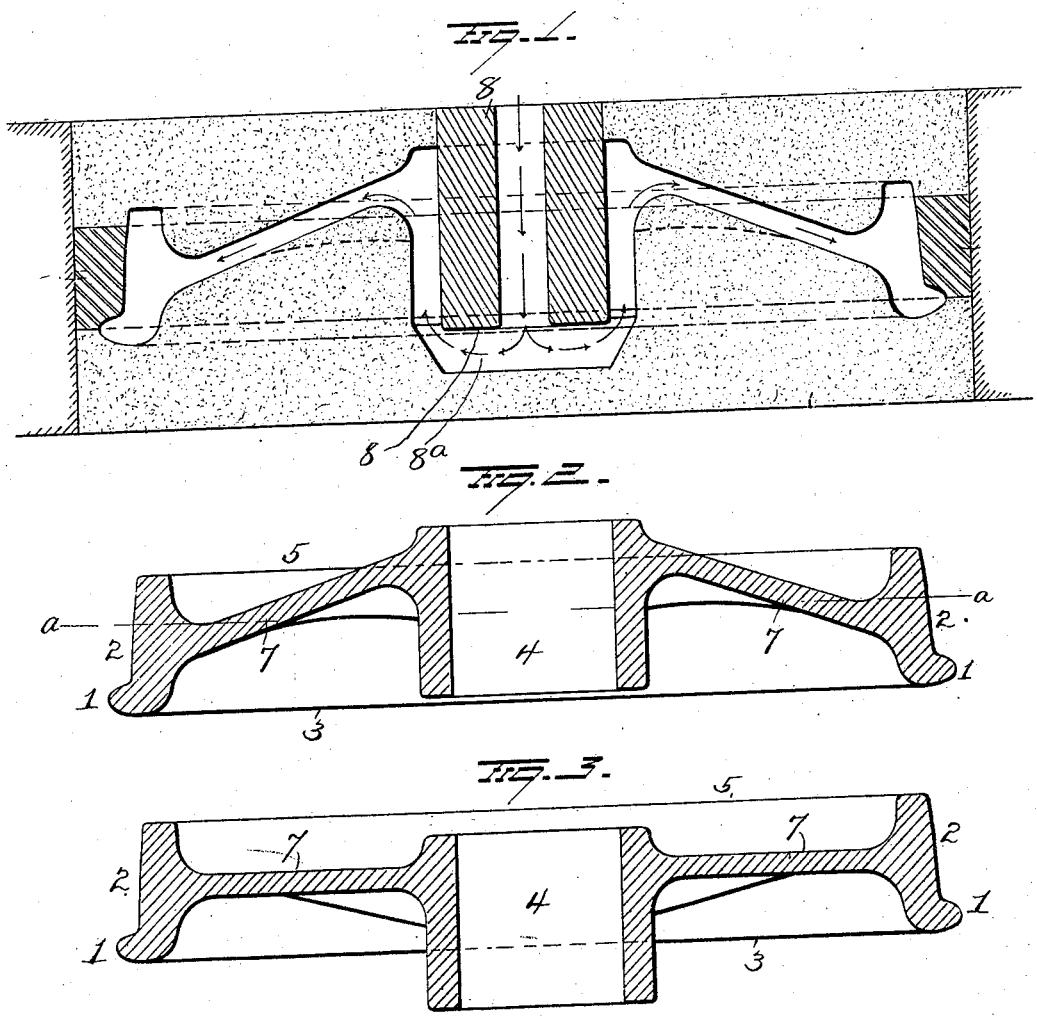

UNITED STATES PATENT OFFICE.

SAMUEL P. BUSH, OF COLUMBUS, OHIO.

METHOD OF MAKING CAR-WHEELS.

1,047,378.　　　　Specification of Letters Patent.　　Patented Dec. 17, 1912.

Application filed April 13, 1912.　Serial No. 690,652.

*To all whom it may concern:*

Be it known that I, SAMUEL P. BUSH, a citizen of the United States, residing at Columbus, in the county of Franklin and State of Ohio, have invented certain new and useful Improvements in Methods of Making Car-Wheels; and I do hereby declare the following to be a full, clear, and exact description of the invention, such as will enable others skilled in the art to which it appertains to make and use the same.

My invention relates to an improvement in the method of making car wheels having a rim portion made up of a metal of one kind chemically and physically, and a central or inner portion of another kind, both kinds being specially adapted for the purpose of the service intended.

It is very desirable in car wheels, to have the rim portion which has to withstand heavy pressures, the heat from brake application, and abrasion, of hard, tough and finely grained steel or iron alloy, and a central or inner portion which may be readily machined at the hub for mounting on an axle, of softer and more malleable metal, and the object of my invention is to secure this distribution in a wheel in a simple and economical manner.

My invention consists in casting the wheel from a pattern, the central portion of which is so located with relation to the rim, that the first metal poured into the mold will gravitate to the rim, and after the rim has been filled, the central portion of the mold will then fill up, and subsequently subjecting the casting, preferably while hot, to pressure so as to impart thereto its final and proper shape.

In the accompanying drawings, Figure 1 is a view in section of a mold in which the wheel is cast; Fig. 2 is a view in section of the wheel as it comes from the mold, and Fig. 3 is a similar view after it has been reshaped.

In car wheels it is customary and essential to have the flange 1 of the rim 2, within a plane 3 passing through the hub 4 of the wheel, and the opposite end of the hub intermediate the planes 3 and 5 as shown in Fig. 3. It is also customary and essential in casting car wheels, to have the flange 1 of the rim at the bottom so that all dirt and impurities, which rise as the mold fills, will be carried to the top thus leaving the cleanest and best metal at the bottom and in the flange 1, where it is most needed. With a mold conforming to the wheel shown in Fig. 3, it is practically impossible to first fill the rim with the first, or harder and tougher metal poured, hence in order to overcome this I provide a distorted pattern shown in Fig. 1 and cast in a mold, shown in Fig. 1, made from said pattern, a wheel shaped as shown in Fig. 2. In the wheel thus produced, the hub 4 is raised to bring one end of the latter approximately in the plane of the flange of the rim, and the opposite end in a plane above the opposite edge 5 of the rim of the wheel. This change in the position of the hub relative to the rim, also changes the elevation and inclination of the web 7, so that in the pattern and mold, the web or plate 7 will be downwardly inclined from the hub 4 to the rim 2 as shown in Figs. 1 and 2, so that the metal, as it enters the web will gravitate to the rim and fill or nearly fill the latter.

In pouring the molten metal into the mold, it is introduced at the center of the hub core 8, as shown by the arrows in Fig. 1, and the first metal poured is of the character desired for the rim. The metal passes through slots 8ᵃ in the lower end of the core and up into the hub, and from the latter down the web 7 into the rim 2. When the mold has been filled to about the horizontal line, *a, a,* shown in Fig. 2, the pouring is discontinued, and metal adapted for the hub 4 and web 7, is then poured without any material delay between the pouring steps. The metal last poured mixes to a certain extent with that in the hub portion of the wheel and forces that which is within the web 7 into the rim 2, until the latter is filled. By this method of pouring the two metals are kept reasonably distinct, hence the rim of the wheel is, when finished, composed of metal best suited to sustain the wear and friction to which the rim is subjected, while the hub and web are more malleable, and the hub is composed of metal that may be readily machined. After the wheel has been cast, and preferably while it is at a forging temperature, I subject the hub 4, and web 7, to pressure with suitable devices, whereby the hub and web are forced from the position shown in Fig. 2, to any suitable final position, but preferably to that shown in Fig. 3. In pressing the hub and web of the wheel from one position to another, as above explained, while the wheel is at a statable forging temperature, the web is shortened up and compressed between the hub and the rim, thus relieving stresses due to shrinkage.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. The method of making wheels consisting in casting in a mold in which the hub and part of the web are elevated above the normal position of these parts in the finished wheel, so that the first metal entering the mold will gravitate to the rim and partly fill the same, then introducing a different metal, which, entering the web forces the metal therein from the first pouring into the rim and then fills the web and hub, and subsequently forcing the hub and web into final position.

2. The method of making wheels, consisting in casting in a mold in which the hub and part of the web are elevated above the normal position of these parts so that the first metal entering the mold will gravitate to the rim and partly fill the same, then introducing a different metal, which entering the web forces the metal therein from the first pouring into the rim and then fills the web and hub, and subsequently forcing the hub and web into final position while the wheel is at a forging temperature.

3. The method of making wheels, consisting in forming a mold in which the hub and web portions of the wheel are elevated above the final position so as to give a downward inclination to the web from the hub to the rim, filling the mold, first with a hard and tough steel or iron alloy followed by a softer and more malleable metal, and subsequently forcing the hub and web portions of the wheel into final position whereby the web between the hub and rim will be shortened.

4. The method of making car wheels, consisting in forming a mold in which the hub and web portions are elevated above the final position so as to give a downward inclination to the web from the hub to the rim, filling the mold first with a hard and tough steel or iron alloy followed by a softer and more malleable metal, and subsequently forcing the hub and web portions of the wheel into their final positions.

5. The method of making wheels, consisting in casting in a mold in which the portion of the web adjacent the hub is in a plane above the rim of the wheel, so that the first metal entering the mold through the hub will gravitate to the rim and partly fill the same, and then introducing a different metal, which entering the web, forces the metal therein from the first pouring into the rim and then fills the web and hub.

In testimony whereof, I have signed this specification in the presence of two subscribing witnesses.

SAMUEL P. BUSH.

Witnesses:
 ARNO EBERLEIN,
 GEO. G. MERRING.

---

Copies of this patent may be obtained for five cents each, by addressing the "Commissioner of Patents, Washington, D. C."